United States Patent [19]

Prue

[11] Patent Number: 4,967,693
[45] Date of Patent: Nov. 6, 1990

[54] ANIMAL TRAINING DEVICE

[75] Inventor: Louis A. Prue, Newport, Vt.

[73] Assignee: Gaston Poulin, Newport, Vt.

[21] Appl. No.: 385,386

[22] Filed: Jul. 27, 1989

[51] Int. Cl.$^5$ .............................................. A01K 15/02
[52] U.S. Cl. ......................................... 119/29; 119/27
[58] Field of Search .................... 119/27, 29, 147.1; 403/93, 97

[56] References Cited

U.S. PATENT DOCUMENTS

| | | | |
|---|---|---|---|
| 1,004,202 | 9/1911 | Root | 119/27 |
| 1,047,994 | 12/1912 | Schmidt | 119/27 |
| 1,062,119 | 5/1913 | Root | 119/27 |
| 1,079,166 | 11/1913 | Cramer | 119/27 |
| 1,399,659 | 12/1921 | Sanders | 119/27 |
| 1,503,039 | 7/1924 | Franklin | 119/27 |
| 1,512,610 | 10/1924 | Kolb | 119/27 |
| 2,328,188 | 8/1943 | Barkey | 119/27 |
| 2,853,052 | 9/1958 | Pearson | 119/27 |
| 4,253,649 | 3/1981 | Hewson | 403/97 |
| 4,614,452 | 9/1986 | Wang | 403/97 |

*Primary Examiner*—John Weiss
*Attorney, Agent, or Firm*—George C. Atwell

[57] ABSTRACT

A device mounted above a cow in its stall for causing the animal to move rearwardly by applying pressure to its shoulders when the animal arches its back for the purpose of defecating or urinating. By moving rearwardly, the animal's droppings will be deposited in the stall's gutter. The device includes a pair of spaced rod members interconnected by a connecting rod. One of the rod members has an integral elongated bar at its lower end situated horizontally above the animal's shoulders and extends normal to the stall's length. The connecting rod includes pivot shafts on each end with each supporting a pair of knob-controlled mating clutch members for manually effecting their release and binding engagement. Manual control of the clutch members permits the rod members and connecting rod to readily located the elongated bar in any desired position.

7 Claims, 1 Drawing Sheet

U.S. Patent   Nov. 6, 1990   4,967,693 ns device of the present invention applied to a
ANIMAL TRAINING DEVICE

BACKGROUND OF THE INVENTION

1. Field of the Invention

The present invention pertains to cattle housed in stalls and, more particulary, to a training device for maintaining the stalls free of the animals' waste material.

2. Description of the Prior Art

It is common practice to provide training devices to cause a cow to move rearwardly when arching its back for the purpose of defecating or urinating so that it will deposit its waste material in the stall's gutter.

The known forms of training devices include electric apparatuses for shocking the animal as well as complex mechanical devices which require considerable time to change their settings to accommodate different size animals.

U.S. Pat. No. 2,328,188 issued to Andrew V. Borkey is typical of the current state of the art. The Borkey device differs from the present invention in that a change in position of the device requires loosening of the mounting base, and it does not provide eye-protecting elements on each end of the horizontal lead. Unlike the present invention, the reference device could not be used for training young animals housed in wood stalls which require that the training device attach directly overhead and depending from its mounting base.

The present invention can be utilized in all types of stalls, including the well-known stanchion type, the tie-in type, and in wood stalls for training young animals. Additionally, the present invention provides eye-protecting elements on each end of the elongated bar to prevent eye injury when the animal swings its head rearwardly.

SUMMARY OF THE INVENTION

The animal training device of the present invention includes a first rod member projecting from an integral base and a second rod member, spaced from the first, having an elongated bar fixed on its lower end. One end of each of the first and second rod members is pivotally connected to the ends on an elongated connecting rod by manually-controlled clutch members. The manually-controlled clutch members permit the elongated bar to be selectively positioned in close proximity with the animals's shoulders. In this position, the elongated bar forms a restraint causing the animal to back up when it attempts to arch its back for the purpose of evacuating.

It is a general object of the invention to provide an animal training device to maintain the animal's stall area clear of its waste material.

A second object of the invention to provide an animal training device that is adaptable for use in all types of stalls and quickly and easily adjusted to accommodate animals of different sizes.

Another object of the invention is to provide an animal training device that includes eye protecting members to prevent injury to the animal.

A further and more specific object of the invention is to provide an animal training device of simplified construction which is relatively inexpensive to manufacture and with long life expectancy.

These and other objects of the invention will become more fully apparent by reference to the appended claims and from the following detailed description of the drawing figures.

DETAILED DESCRIPTION OF THE PREFERRED EMBODIMENT

Figure 2:
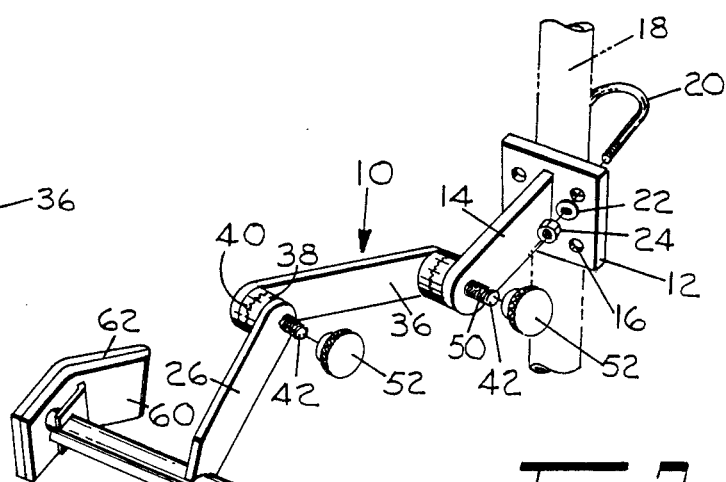
FIG. 2 is a perspective view in exploded form showing the various elements comprising the invention.
Figure 1:
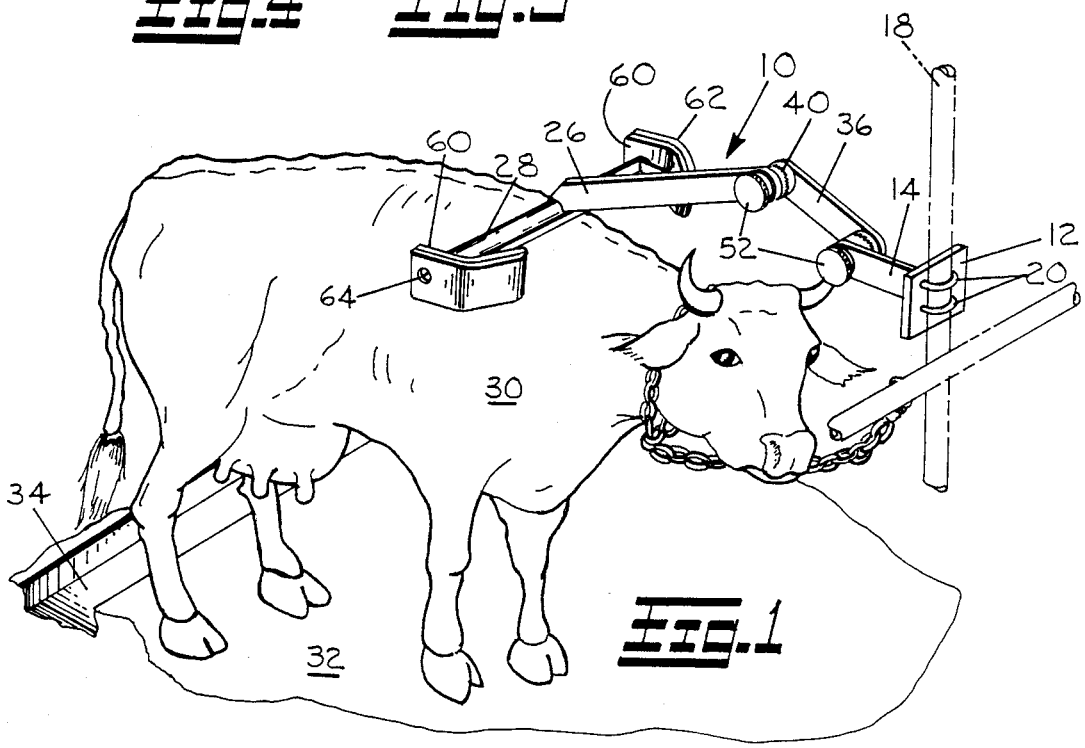
FIG. 1 is a perspective view showing the animal training device of the present invention applied to a tie-in stall and its association with the animal.

Referring to the various figures of the accompanying drawing, the animal training device of the present invention is identified generally by numeral 10 and includes a mounting base 12 having an integral first rod member 14 projecting therefrom. The mounting base 12 is provided with four mounting holes 16 and, as shown in FIGS. 1 and 2, is adapted to assemble on a pipe 18 by means of U-bolts 20 including washers 22 and hex nuts 24.

The device includes a second rod member 26 spaced from the first rod member 14 and extending in a generally downward direction. Its lower end has an elongated bar 28 fixed thereon which is positioned in close proximity with the shoulders of the animal 30. This elongated bar 28 extends in a direction normal to the length of the animal's stall 32 and includes the usual disposal gutter 34.

The first and second rod members 14 and 26, respectively, are pivotally connected to opposite ends of an elongated connecting rod 36. The means forming these pivotal connections defines mating clutch members 38 and 40 carried on a horizontally disposed pivot shaft 42.

Figure 3:
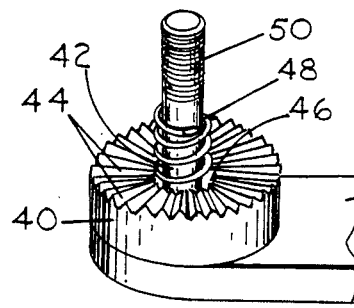
FIG. 3 is a perspective view of one of the clutch members taken along line 3—3 in FIG. 2.

FIG. 3 shows one of the mating clutch members on an enlarged scale in perspective and includes a plurality of teeth 44 disposed in a circular array. In assembled position, the teeth of clutch member 38 are adapted to mesh with the teeth of clutch member 40. As shown in FIG. 3, each clutch member 38 and 40 includes a centrally located circular recess defining a seat 46 for receiving one end of a coil spring 48. These coil springs are interposed between clutch members 38 and 40. Pivot shaft 42 is threaded on one end as at 50 and is adapted to internally receive threaded knobs 52 thereon. Knobs 52 are manually operable, and provide a means of obtaining unlimited positioning locations for elongated bar 28.

Referring again to FIGS. 2 and 4, the underside of the elongated bar 28 is provided with a plurality of downwardly extending teeth 54 that extend the longitudinal length thereof. These teeth 54 are rounded at their tips to prevent injury to the animal but which provide a more sensitive feeling when the animal arches its back.

Figure 5:
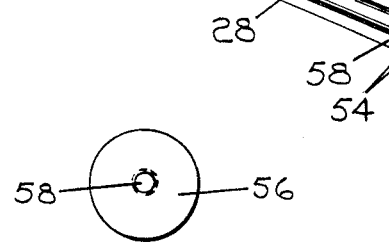
FIG. 5 is a modification of the elongated bar shown in FIG. 4.

A modification of the elongated bar 28 is depicted by numeral 56 in FIG. 5 and is provided with a smooth surface along its entire length. This smooth surface is considered appropriate for most animals for the restraint formed by the elongated bar 56 is sufficient to cause the animal to back up and deposit its waste in the disposal gutter 34.

Figure 4:
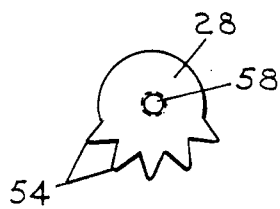
FIG. 4 is an end view of the elongated bar as seen looking in the direction of indicating arrows of line 4—4 in FIG. 2.

As shown in FIG. 2, 4, and 5, the ends of the elongated bars 28 and 56 are internally threaded as at 58.

Arcuated pads 60, having any suitable soft resilient material, such as rubber 62, attached to their outer surfaces, are adapted to assemble on each end of the elongated bars 28 and 56 by means of screws 64. It is well known that an animal frequently swings its head rearwardly and the arcuated pads serve to prevent injury to said animal's eyes. Although not shown, it should be understood that the eyeprotecting devices could be in a variety of forms, such as resilient ball members attached to the ends of the elongated bars 28 and 56.

Additionally, it should also be understood that the animal training device of the present invention is applicable to all types of stalls, including stanchion and tie-in types as well as for young animals where the mounting base 12 would have to be positioned directly above the animal.

Although the present invention has been described in connection with a preferred embodiment and one modification, it is to be understood that other modifications and variations may be resorted to without departing from the spirit and scope of the invention, as those skilled in the art will readily understand. Such modifications and variations are considered to be within the purview and scope of the invention and the appended claims.

I claim:

1. An articulated training structure for disposition above a domestic animal secured in a stall, comprising:
   a first rod member adapted to project outwardly from an integral mounting base;
   a second rod member spaced from and disposed to project generally downwardly in the same vertical plane as the first rod member;
   an elongated connecting rod secured by a first pivot means at one of its ends, to the outer end of the first rod member, and secured by a second pivot means at its other end, to a first end of the second rod member, whereby the connecting rod extends through the space between the first rod member and the second rod member;
   the second rod member having an integral elongated bar at its second end for disposition horizontally above the animal's back and normal to the length of the stall, with the point of integration of the elongated bar with the second rod member being substantially intermediate the opposite ends of the elongated bar; and
   each of the pivot means comprising a pair of mating clutch members carried on a horizontally disposed pivot shaft, with knob means on each shaft for selectively manually causing the clutch members to bindingly engage such that the second rod member and the connecting rod can be selectively reoriented through the same vertical plane and releasably locked in predetermined relative angular disposition where the bar is at a level lower than the second pivot means.

2. The structure of claim 1 wherein the lower surface of the bar has a plurality of radially outward-projecting teeth arrayed along the longitudinal length of the bar.

3. The structure according to claim 2 wherein said integral elongated bar is of circular configuration along its entire length.

4. The structure according to claim 2 wherein each end of said integral elongated bar has an arcuated pad assembled thereto.

5. The structure according to claim 4 wherein the outer surface of each said arcuated pad has a soft resilient material attached thereto for preventing eye injury when the animal swings its head rearwardly.

6. The structure according to claim 2 wherein the inner surface of each of said clutch members includes a plurality of teeth formed in a circular array for meshing engagement with its mating clutch member.

7. The structure according to claim 6 wherein said mating clutch members have a coil spring interposed therebetween for disengaging their meshing engagement upon manual rotation of said knob means.

* * * * *